United States Patent [19]

Kasuga

[11] Patent Number: 5,067,823
[45] Date of Patent: Nov. 26, 1991

[54] LINEAR GUIDE APPARATUS

[75] Inventor: Shinichi Kasuga, Maebashi, Japan

[73] Assignee: Nippon Seiko Kabushiki Kaisha, Tokyo, Japan

[21] Appl. No.: 528,128

[22] Filed: May 23, 1990

[30] Foreign Application Priority Data

May 24, 1989 [JP] Japan .................................. 1-130575

[51] Int. Cl.[5] ............................................. F10C 29/06
[52] U.S. Cl. ...................................... 384/45; 384/49; 384/55
[58] Field of Search .................... 384/43, 44, 45, 49, 384/55, 59

[56] References Cited

U.S. PATENT DOCUMENTS

| 3,008,774 | 11/1961 | Morris et al. | 384/45 |
| 3,311,426 | 3/1967 | Binns | 384/45 |
| 4,025,995 | 5/1977 | Thomson | 384/45 X |
| 4,576,421 | 3/1986 | Teramachi | 384/45 |
| 4,775,247 | 10/1988 | Isert | 384/45 X |

FOREIGN PATENT DOCUMENTS 61-180018  8/1986  Japan .

Primary Examiner—Thomas R. Hannon
Attorney, Agent, or Firm—Basile and Hanlon

[57] ABSTRACT

A guide rail of a linear guide apparatus is formed of a rail main body and a pair of rail members. The rail main body has a U-shaped cross section and recessed grooves respectively formed in inner surfaces of opposed side walls so that the recessed grooves extend axially and oppose each other. The pair of rail members, each having a ball rolling groove formed in an inner surface, are integrally fitted into the recessed grooves of the rail main body. The rail members are made of a material having a high hardness, and the rail main body is made of a material having a hardness lower than the rail members.

2 Claims, 3 Drawing Sheets

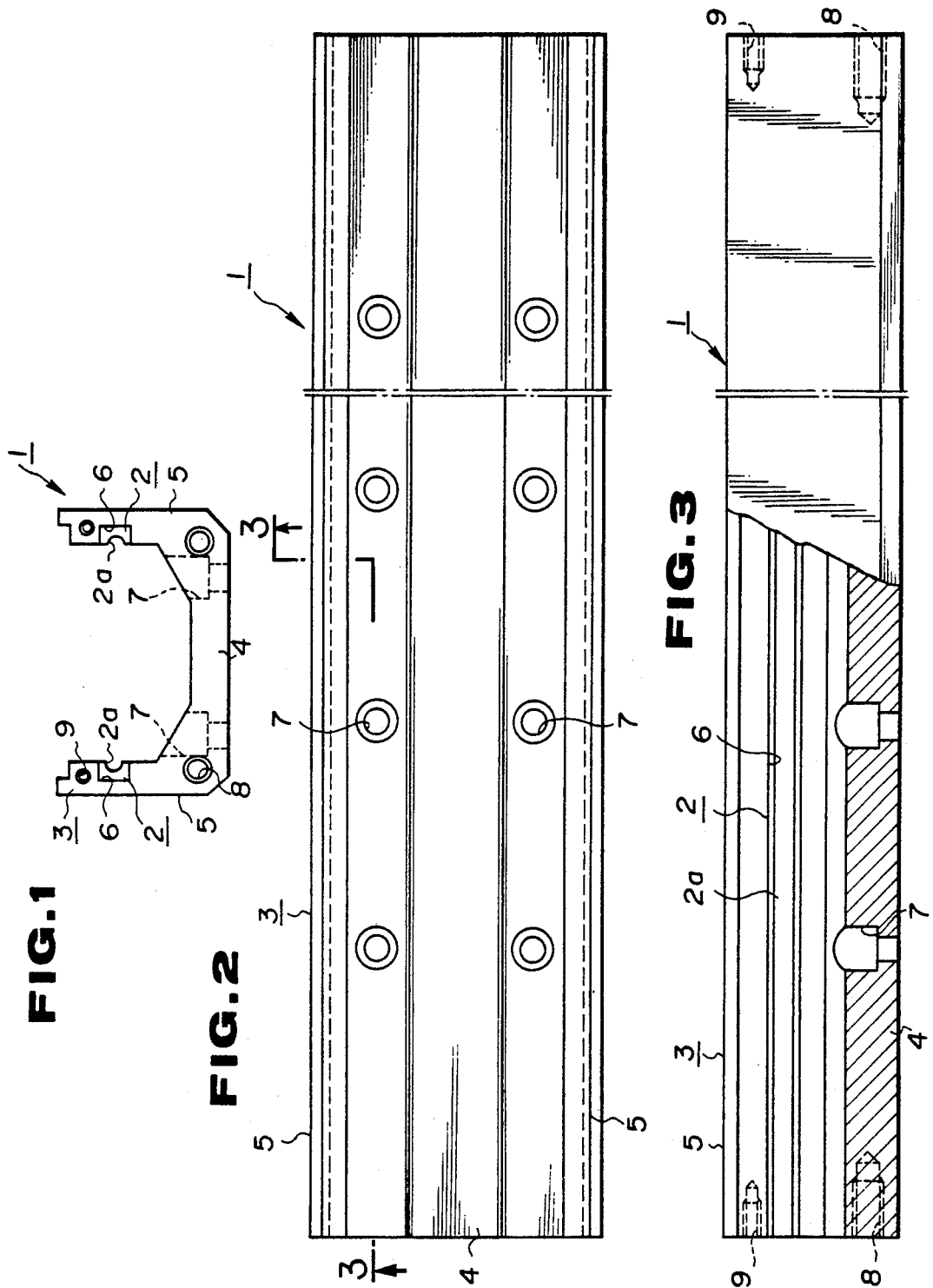

LINEAR GUIDE APPARATUS

BACKGROUND OF THE INVENTION

1. Field of the Invention

The present invention relates to a linear guide apparatus having a moving member movable in an axial direction along a guide rail through rolling balls which are interposed between mutually opposing ball rolling grooves formed in the guide rail and the moving member.

2. Description of the Prior Art

As a prior art linear guide apparatus of this type, for example, the linear guide apparatus includes a long guide rail having axially extending ball rolling grooves, and a moving member having ball rolling grooves respectively opposing the ball rolling grooves of the guide rail. The moving member is moved in an axial direction through rolling balls interposed between mutually opposing ball rolling grooves in the guide rail and the moving member.

Generally, in such a prior art linear guide apparatus, it is necessary to insure that the hardness of the ball rolling grooves of the guide rail is sufficiently high. However, since it is practically difficult to raise the hardness of only the ball rolling grooves by heat treatment, the whole guide rail is subjected to heat treatment. When the whole guide rail is heat treated, a bending deformation is caused in the guide rail, and work for correcting the bending deformation becomes necessary.

SUMMARY OF THE INVENTION

The invention was made in view of the problem in the prior art, and it is an object of the invention to provide a linear guide apparatus in which bending deformation is not caused in a guide rail, and a sufficiently high hardness of the ball rolling grooves is insured.

In order to achieve the object, a linear guide apparatus in accordance with the invention comprises a guide rail having axially extending ball rolling grooves, and a moving member having ball rolling grooves respectively opposing the ball rolling grooves of the guide rail and axially movable along the guide rail through rolling balls interposed between the mutually opposing ball rolling grooves. The guide rail includes a pair of rail members, respectively having the ball rolling grooves, and a rail main body to which the pair of rail members are integrally coupled. The rail members are made of a material having a high hardness and the rail main body is made of a material having a lower hardness than the rail members.

Since the guide rail is constituted by a pair of rail members made of a material having a high hardness, and a rail main body is made of a material having a lower hardness than the rail members and integrally coupled to the rail members, a required hardness of the ball rolling grooves can be insured without subjecting the guide rail to a hardening treatment, such as a heat treatment or the like.

BRIEF DESCRIPTION OF THE DRAWINGS

FIG. 1 is a front elevational view of a guide rail of a feed unit apparatus of an embodiment of the invention;

FIG. 2 is a plan elevational view of the guide rail of FIG. 1;

FIG. 3 is a side elevational view of the guide rail partially in cross section taken along the line 3—3 in FIG. 2;

DESCRIPTION OF THE PREFERRED EMBODIMENT

An embodiment of the present invention will be described with reference to the drawings. In this embodiment, a linear guide apparatus according to the present invention is applied to a feed unit apparatus comprised of a ball screw mechanism and a linear guide mechanism integrally combined with each other.

Figure 4:
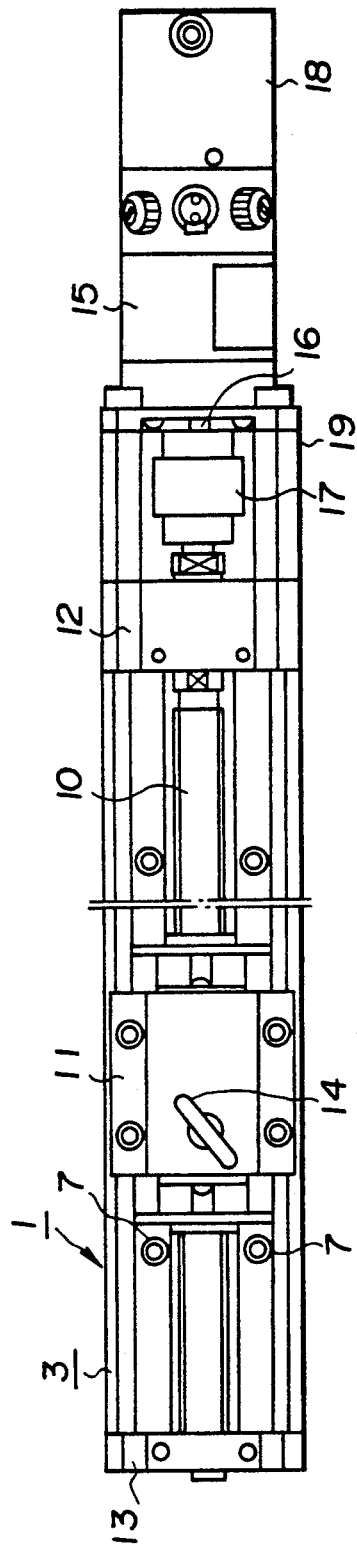
FIG. 4 is a plan elevational view of the feed unit apparatus of the embodiment of the invention.

FIGS. 1 to 3 show a guide rail 1 used in a feed unit apparatus shown in FIG. 4. The guide rail 1 is constituted by a pair of long rail members 2, respectively having ball rolling grooves 2a, and a rail main body 3 to which the rail members 2a are integrally coupled.

The rail members 2 are formed of a material having a high hardness, for example, a high carbon chrome bearing steel or a stainless steel.

The rail main body 3 is formed of a material having a hardness lower than that of the rail members 2 and, further, one which is easily worked, is light in weight, and has a high rust resisting property, such as aluminum alloy. The rail main body 3 is a long member having a U-shaped cross section, and side walls 5 extending vertically and upwardly from both lateral edges of a bottom portion 4. An axially extending recessed groove 6 is formed in an inner surface of each side wall. The rail member 2 is fitted into the recessed groove 6. Two rows of bores 7 are formed in the bottom portion of the rail main body 3. The two rows of bores 7 are aligned and spaced from an axial center line. Further, the bores 7 in each row are spaced from each other at a predetermined interval. The bores 7 are used for fixing bolts for attaching the rail main body 3 to another member. Furthermore, screw bores 8 and 9 are formed in each of opposite end faces of the rail main body 3.

Figure 5:
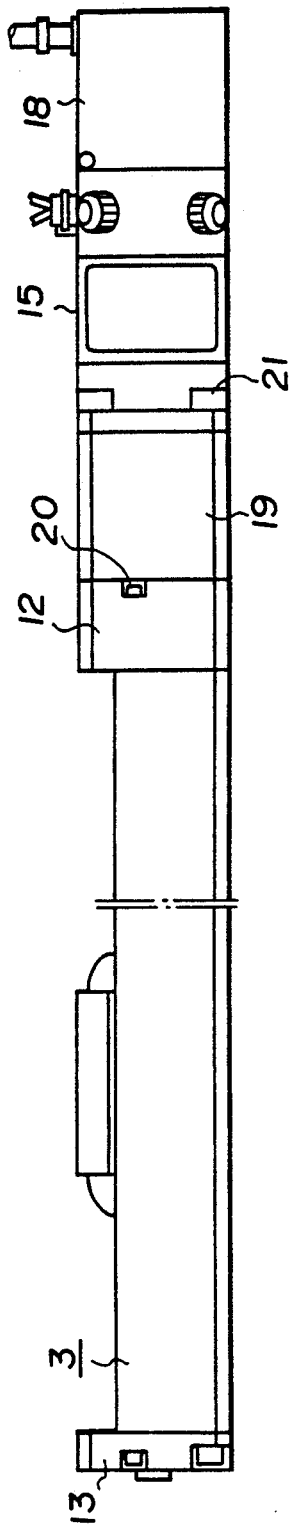
FIG. 5 is a side elevational view of the feed unit apparatus of FIG. 4.

A feed unit apparatus shown in FIGS. 4 and 5 includes a ball screw shaft 10 having a spiral groove (not shown) formed in an outer surface thereof, and a nut block (moving member) 11 threaded about the sprial groove through a plurality of balls (not shown).

The ball screw shaft 10 is rotatably supported by a support unit 12 secured at one axial end of the rail main body 3 and by an end plate 13 secured to the other end of the rail main body 3. Also, the support unit 12 supports the ball screw shaft 10 in a non-axially movable manner.

The nut block 11 has a ball circulating path 14 in communication with the spiral groove of the ball screw shaft 10, and has ball rolling grooves (not shown) respectively opposing the ball rolling grooves 2a of the rail members 2. When a rotation of the ball screw shaft 10 is transmitted to the nut block 11 through the rolling of the balls which circulate within the ball circulating path 14, the nut block 11 is moved in an axial direction along the guide rail 1 through the rolling balls interposed between the ball rolling grooves 2a of the rail members 2 and the ball rolling grooves (not shown) of the nut block 11.

An output shaft 16 of a driving motor 15 is connected to the ball screw shaft 10 through a coupling 17. An encoder 18 is provided to detect a rotation of the driving motor 15 thereby to control the rotation of the ball screw shaft 10. Furthermore, a spacer 19 is disposed between the driving motor 15 and the support unit 12.

The support unit 12 is fastened to one end of the rail main body 3 by screws 20 which are threaded into the screw bores 9. The driving motor 15 is secured to the rail main body 3 together with the spacer 19 and the support unit 12 by screws 21 which are threaded into the screw bores 8.

Next, a manufacturing method of the guide rail 1 which includes the rail members 2 and the rail main body 3 integrally coupled with each other will be explained.

Figure 6:
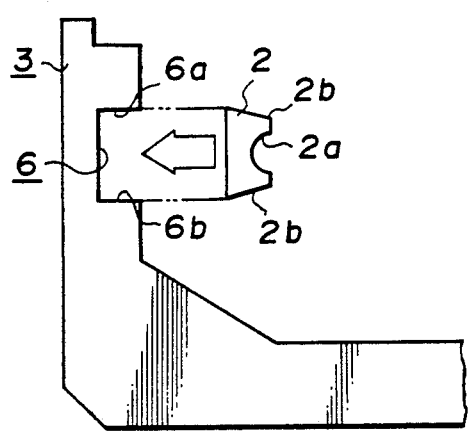
FIGS. 6 and 7 are diagrams useful in explaining a manufacturing method of the guide rail.

First, the rail main body 3 having the recessed grooves 6 is made by drawing of a material, such as aluminum alloy or the like. At the same time, each of the pair of rail members 2 having the ball rolling groove 2a is made by drawing of a material, such as a high carbon chrome bearing steel or the like. The rail member 2, as shown in FIG. 6, has tapered surfaces 2b on both upper and lower surfaces so that its width is decreased from an end face in contact with the rail main body 3 towards the other end face having the ball rolling groove 2a. The tapered surface 2b is preferably inclined at an angle of 15 degrees.

Figure 7:
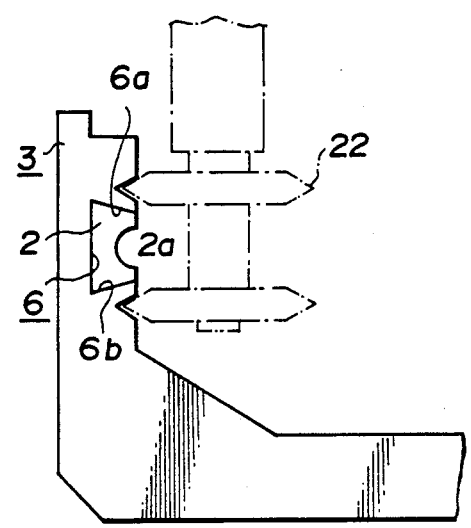

Then, the rail member 2 is inserted into the recessed groove 6 of the rail main body 3 in the direction of the arrow, as shown in FIG. 6. Thereafter, as shown in FIG. 7, an upper and a lower portion of the recessed groove 6 of the rail main body 3 are plastically deformed by roll formation or the like by using a forming roll 22 so that upper and lower inner surfaces 6a and 6b of the recessed groove 6 are brought into close contact with the upper and lower tapered surfaces 2b of the rail member 2. As a result, the rail members 2 are integrally coupled with the rail main body 3 to complete the guide rail 1.

In the feed unit apparatus structured as described above, the guide rail 1 is constituted by the rail members 2 formed of a material having a high hardness, for example, a high carbon chrome bearing steel or stainless steel, and the rail main body 3 formed of a material having a hardness lower than the rail members 2, which material is easy to work, light in weight, and has a high rust resistant property, for example, aluminum alloy, in which the rail members 2 and the rail main body 3 are integrally coupled with each other. As a result, the hardness of the portions of the ball rolling grooves 2a can be sufficiently insured without requiring a hardening treatment, such as a heat treatment of guide rail 1. It is possible to achieve a reduction in weight and to improve the rust resistant property of the rail main body 3 without causing a bending deformation of the guide rail 1.

Furthermore, as additional manufacturing methods of a guide rail 1 having rail members 2 and a rail main body 3 coupled integrally with each other, the following manufacturing methods are available other than the one described in the foregoing:

(1) In casting a rail main body 3, rail members 2 are also cast into the rail main body 3 to thereby integrally couple the rail members 2 and the rail main body 3 with each other, (2) Rail members 2 and a rail main body 3 are integrally coupled by brazing, or (3) The width of the rail members 2 is made somewhat larger than the width of the recessed grooves 6, and the rail members 2 are press-fit into the recessed grooves 6 to thereby integrally couple the rail members 2 and the rail main body 3 with each other.

As described in the foregoing, in a linear guide apparatus according to the present invention, a guide rail includes a pair of rail members respectively having ball rolling grooves and a rail main body to which the rail members are integrally coupled. The rail members are formed of a material having a high hardness and the rail main body is formed of a material having a lower hardness than the rail members, that is, the guide rail is constructed of the rail members formed of the high hardness material and the rail main body is formed of the lower hardness material than the rail members. The rail members and the rail main body are integrally coupled with each other. Accordingly, the hardness of the ball rolling grooves can be sufficiently insured without requiring a hardening treatment. Also, the guide rail can be made lighter in weight without causing a bending deformation of the rail main body.

What is claimed is:

1. In a linear guide apparatus comprising a guide rail having a pair of axially extending ball rolling grooves, and a moving member having ball rolling grooves respectively opposing the ball rolling grooves of the guide rail and movable axially along the guide rail through the rolling of a plurality of balls interposed between the mutually opposing ball rolling grooves of the guide rail and the moving member, the improvement in which:

the guide rail includes a pair of rail members respectively having the ball rolling grooves formed therein and a rail main body to which the pair of rail members are integrally coupled, the rail main body having a U-shaped cross section and formed of a lightweight metal;

the moving member being in the form of a nut block axially movable in the U-shaped cross section of the rail main body when driven by a ball screw shaft engaged therewith;

a pair of recessed grooves respectively formed in the inner surfaces of the side walls of the rail main body in opposing relation to each other, each of the recessed grooves having a width at a bottom surface equal to the width of a bottom surface of each of the rail members;

each of the rail members having tapered surfaces formed in upper and lower surfaces thereof so that the width of each rail member is reduced from the bottom surface to an inner surface having the ball rolling groove formed therein, each of the rail members being formed of a hardened steel to provide each of the rail members with a hardness greater than the hardness of the rail main body; and the rail main body having a pair of notches formed in each of the inner surfaces of the side walls thereof, the notches being formed by plastic deformation of the upper and lower portions of each recessed groove to bring the upper and lower inner surfaces of each recessed groove into close contact with the tapered surfaces of each of the rail members and to integrally couple each of the rail members to the rail main body.

2. The improvement in a linear guide apparatus according to claim 1 wherein the tapered surface of each of the rail members is inclined at an angle of substantially fifteen degrees with respect to a horizontal plane and the width of the bottom surface of each rail member is substantially two times the height of each rail member between the bottom surface and the inner surface thereof.

* * * * *